United States Patent
Xu et al.

(10) Patent No.: US 12,395,118 B1
(45) Date of Patent: Aug. 19, 2025

(54) MULTI-MODE SWITCHING CONTROL SYSTEM FOR PHOTOVOLTAIC ARRAY

(71) Applicant: QINGHAI BRANCH OF CHINA HUANENG GROUP CO., LTD., Qinghai (CN)

(72) Inventors: Shiming Xu, Qinghai (CN); Anzhou Deng, Qinghai (CN); Falong Tian, Qinghai (CN); Jia Zhang, Qinghai (CN)

(73) Assignee: QINGHAI BRANCH OF CHINA HUANENG GROUP CO., LTD., Xining (CN)

( * ) Notice: Subject to any disclaimer, the term of this patent is extended or adjusted under 35 U.S.C. 154(b) by 0 days.

(21) Appl. No.: 19/195,617

(22) Filed: Apr. 30, 2025

(30) Foreign Application Priority Data

Jul. 18, 2024 (CN) .......................... 202410967586.2

(51) Int. Cl.
*H02S 20/32* (2014.01)
(52) U.S. Cl.
CPC .................... *H02S 20/32* (2014.12)
(58) Field of Classification Search
CPC ...................................................... H02S 20/32
See application file for complete search history.

(56) References Cited

U.S. PATENT DOCUMENTS

2021/0194417 A1   6/2021 Sharpe
2024/0372505 A1* 11/2024 Kresse .................. F24S 30/452

FOREIGN PATENT DOCUMENTS

CN          116661509 A     8/2023

* cited by examiner

*Primary Examiner* — Jayne L Mershon

(57) ABSTRACT

The disclosure relates to the technical field of photovoltaic arrays, and provides a multi-mode switching control system for photovoltaic arrays. The first switching unit generates a normal tracking mode based on solar illumination detection points; the second switching unit obtains the shadow shielding state of the photovoltaic arrays to be switched and controlled, and generates a reverse tracking mode based on the shadow shielding state; the third switching unit generates a setting-level wind avoidance mode based on the wind speed environment information; the fourth switching unit generates an inclined snow avoidance mode based on the snowpack environment information; the fifth switching unit generates a maintenance mode based on the operation state; when the sixth switching unit monitors the preset control condition, it generates priority control strategy for the normal tracking mode, the reverse tracking mode, the setting-level wind avoidance mode, the inclined snow avoidance mode and the maintenance mode.

7 Claims, 1 Drawing Sheet

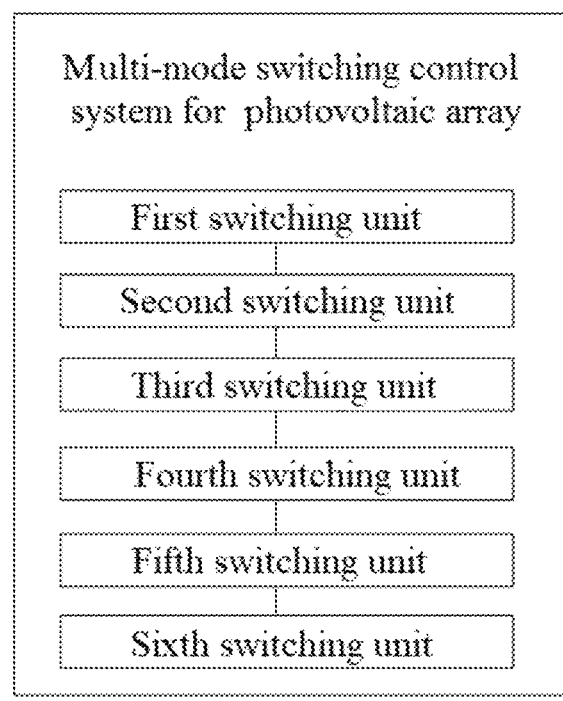

MULTI-MODE SWITCHING CONTROL SYSTEM FOR PHOTOVOLTAIC ARRAY

CROSS-REFERENCE TO RELATED APPLICATION

This application claims priority of Chinese Patent Application No. 202410967586.2, filed on Jul. 18, 2024, the entire contents of which are incorporated herein by reference.

TECHNICAL FIELD

The disclosure relates to the technical field of photovoltaic arrays, and in particular to a multi-mode switching control system for photovoltaic arrays.

BACKGROUND

Photovoltaic array is a key component of solar power generation system, which is formed by connecting a plurality of photovoltaic assemblies or battery panels. Photovoltaic array, also known as PV array, is a DC power generation unit assembled by multiple photovoltaic assemblies or photovoltaic panels in a mechanical and electrical way, which is mainly used to convert solar light energy into electric energy.

Photovoltaic array is an important part of solar power generation system, and its performance directly affects the power generation efficiency of the whole system. However, due to the constant changes of external environment and working conditions, such as the changes of light intensity, temperature, shadow and other factors, the working state of photovoltaic array needs to be constantly adjusted to maintain the best operating state. The traditional photovoltaic array control system can only work under specific conditions, and it is difficult to adapt to the complex and changeable external environment, which has been unable to meet the daily operation needs of the power station and seriously affects the revenue of the power station. The investment proportion in the electronic control part and slewing mechanism of the original tracking system is too high. If the original tracking system scheme is used for reconstruction, the excessive economic investment will seriously crowd out the income of the power station.

SUMMARY

An embodiment of the disclosure provides a multi-mode switching control system for photovoltaic arrays, which is used to solve the technical problems in the related art that the working mode of the photovoltaic arrays can not be adjusted in real time according to the external environment and working conditions, the power generation efficiency of the photovoltaic arrays can not be improved, the income of a power station is seriously affected, and the power generation cost is increased.

In order to achieve the above object, the disclosure provides a multi-mode switching control system for photovoltaic arrays, including:

a first switching unit, configured for determining photovoltaic arrays to be switched and controlled, setting a plurality of solar illumination detection points on the photovoltaic arrays to be switched and controlled, and generating a normal tracking mode for the photovoltaic arrays to be switched and controlled based on the solar illumination detection points, a second switching unit, configured for obtaining a shadow shielding state of the photovoltaic arrays to be switched and controlled, and generating a reverse tracking mode for the photovoltaic arrays to be switched and controlled based on the shadow shielding state, a third switching unit, configured for detecting wind speed environment information of the photovoltaic arrays to be switched and controlled, and generating a setting-level wind avoidance mode for the photovoltaic arrays to be switched and controlled based on the wind speed environment information, a fourth switching unit, configured for collecting snowpack environmental information of the photovoltaic arrays to be switched and controlled, and generating an inclined snow avoidance mode for the photovoltaic arrays to be switched and controlled based on the snowpack environmental information, a fifth switching unit, configured for determining operation state of the photovoltaic arrays to be switched and controlled, and generating a maintenance mode for the photovoltaic arrays to be switched and controlled based on the operation state, a sixth switching unit, configured for generating a priority control strategy for the normal tracking mode, the reverse tracking mode, the setting-level wind avoidance mode, the inclined snow avoidance mode and the maintenance mode when a preset control condition is monitored.

Further, the First Switching Unit is Configured for the Following:

the first switching unit is configured for detecting a real-time illumination intensity of each of the solar illumination detection points in real time and generating a first reference value according to the real-time illumination intensity;

the first switching unit is configured for obtaining a previous historical illumination intensity and corresponding historical power generation amount of each of the solar illumination detection points;

the first switching unit is configured for obtaining a power generation amount range corresponding to each historical illumination intensity, where the power generation amount range includes first power generation amount and second power generation amount, and the first power generation amount is smaller than the second power generation amount;

the first switching unit is configured for collecting and dividing all historical power generation amount, where when historical power generation amount is less than or equal to corresponding first power generation amount, all corresponding solar illumination detection points are divided into a first detection point set;

the first switching unit is configured for dividing all corresponding solar illumination detection points into a second detection point set when the historical power generation amount is greater than corresponding first power generation amount and less than or equal to corresponding second power generation amount;

the first switching unit is configured for dividing all corresponding solar illumination detection points into a third detection point set when the historical power generation amount is greater than corresponding second power generation amount;

the first switching unit is configured for calculating reference values corresponding to all the solar illumination detection points according to the first reference value, the first detection point set, the second detection point set and the third detection point set; and the first switching unit is configured for extracting all the reference values in real time, and selecting a maximum reference value to generate the normal tracking mode for the photovoltaic arrays to be switched and controlled.

Further, the First Switching Unit is Configured for the Following:

the first switching unit is configured for calculating a first reference optimization value corresponding to the first detection point set, and calculating a reference value of each of solar illumination detection points in the first detection point set based on the first reference optimization value and the first reference value;

the first switching unit is configured for obtaining a second reference optimization value corresponding to the second detection point set, and calculating a reference value of each of solar illumination detection points in the second detection point set based on the second reference optimization value and the first reference value; and the first switching unit is configured for calculating a third reference optimization value corresponding to the third detection point set, and calculating a reference value of each of solar illumination detection points in the third detection point set based on the third reference optimization value and the first reference value.

Further, the First Switching Unit is Configured for the Following:

the first switching unit is configured for calculating the first reference optimization value according to following formula:

$$h1 = 1 - \frac{\sum_{i=1}^{n1}(d - di)}{f1}$$

where h1 is the first reference optimization value, n1 is a number of solar illumination detection points in the first detection point set, di is power generation amount corresponding to an i-th solar illumination detection point in the first detection point set, d is first power generation amount corresponding to the i-th solar illumination detection point, and f1 is power generation amount and value corresponding to a solar illumination detection point in the first detection point set; and the first switching unit is configured for calculating the third reference optimization value according to following formula:

$$h3 = 1 + \frac{\sum_{j=1}^{n3}(e - ej)}{f2}$$

where h3 is the third reference optimization value, n3 is a number of solar illumination detection points in the third detection point set, ej is power generation amount corresponding to a j-th solar illumination detection point in the third detection point set, e is second power generation amount corresponding to the j-th solar illumination detection point, and f2 is power generation amount and value corresponding to a solar illumination detection point in the third detection point set.

Further, the Second Switching Unit is Configured for the Following:

the second switching unit is configured for obtaining real-time image data of the photovoltaic arrays to be switched and controlled;

the second switching unit is configured for preprocessing the real-time image data, where the preprocessing includes denoising and enhancing contrast;

the second switching unit is configured for identifying a shadow area in the real-time image data based on an edge detection algorithm;

the second switching unit is configured for calculating an area ratio $\Delta S$ between the shadow area and the real-time image data, and determining whether to generate the reverse tracking mode according to a relationship between the area ratio $\Delta S$ and a preset area ratio S;

the second switching unit is configured for determining not to generate the reverse tracking mode when the area ratio $\Delta S$ is less than the preset area ratio S; and the second switching unit is configured for determining to generate the reverse tracking mode when the area ratio $\Delta S$ is greater than or equal to the preset area ratio S.

Further, the Third Switching Unit is Configured for the Following:

the third switching unit is configured for detecting first wind speed data of the photovoltaic arrays to be switched and controlled at a first preset time node;

the third switching unit is configured for detecting second wind speed data of the photovoltaic arrays to be switched and controlled at a second preset time node;

the third switching unit is configured for calculating wind speed data difference value between the first wind speed data and the second wind speed data, and calculating time node difference value between the first preset time node and the second preset time node;

the third switching unit is configured for calculating a data ratio of the wind speed data difference value and the time node difference value, and determining whether to generate the setting-level wind avoidance mode according to a relationship between the data ratio and a preset data ratio;

the third switching unit is configured for determining not to generate the setting-level wind avoidance mode when the data ratio is less than the preset data ratio; and the third switching unit is configured for determining to generate the setting-level wind avoidance mode when the data ratio is greater than or equal to the preset data ratio.

Further, the Fourth Switching Unit is Configured for the Following:

the fourth switching unit is configured for collecting surface temperature and reflectivity data of the photovoltaic arrays to be switched and controlled in real time by using an optical sensor;

the fourth switch unit is configured for determining the photovoltaic arrays to be switched and controlled having snowpack when the surface temperature is less than a preset temperature and the reflectivity data is greater than a preset reflectivity;

the fourth switching unit is configured for collecting ambient temperature of the photovoltaic arrays to be switched and controlled, and predicting a snowpack melting rate according to the ambient temperature;

the fourth switching unit is configured for determining whether to generate the inclined snow avoidance mode according to a relationship between the snowpack melting rate and a preset snowpack melting rate;

the fourth switching unit is configured for determining to generate the inclined snow avoidance mode when the snowpack melting rate is less than the preset snowpack melting rate; and the fourth switching unit is configured for determining not to generate the inclined snow avoidance mode when the snowpack melting rate is greater than or equal to the preset snowpack melting rate.

Further, the Sixth Switching Unit is Configured for the Following:

the sixth switching unit is configured for obtaining influence attribute information generated by each of modes on the photovoltaic arrays to be switched and controlled and calculating a priority value corresponding to each of the modes according to the influence attribute information, where the modes include the normal tracking mode, the reverse tracking mode, the setting-level wind avoidance mode, the inclined snow avoidance mode and the maintenance mode;

the sixth switching unit is configured for generating the priority control strategy for the photovoltaic arrays to be switched and controlled based on the priority value; and the sixth switching unit is configured for calculating the priority value corresponding to each of the modes according to following formula:

$$gt = b \times \frac{\sum_{t=1}^{m}(rt \times kt)}{m}$$

where gt is a priority value corresponding to a t-th mode, b is a weight corresponding to the t-th mode, m is a number of influence attribute information corresponding to the t-th mode, rt is a numerical value of influence attribute information corresponding to the t-th mode, and kt is a weight of influence attribute information corresponding to the t-th mode.

Compared with the related art, the disclosure has the following beneficial effects.

The disclosure provides a multi-mode switching control system for photovoltaic arrays, where a first switching unit generates a normal tracking mode based on solar illumination detection points; the second switching unit obtains the shadow shielding state of the photovoltaic arrays to be switched and controlled, and generates a reverse tracking mode based on the shadow shielding state; the third switching unit generates a setting-level wind avoidance mode based on the wind speed environment information; the fourth switching unit generates an inclined snow avoidance mode based on the snowpack environment information; the fifth switching unit generates a maintenance mode based on the operation state; when the sixth switching unit monitors the preset control condition, it generates priority control strategy for the normal tracking mode, the reverse tracking mode, the setting-level wind avoidance mode, the inclined snow avoidance mode and the maintenance mode, and adjusts the working mode of the photovoltaic arrays in real time by monitoring the working state and external environmental conditions of the photovoltaic arrays in real time, thereby optimizing the power generation performance of the photovoltaic arrays and improving the power generation efficiency and power station income of the photovoltaic arrays.

BRIEF DESCRIPTION OF THE DRAWINGS

Various other advantages and benefits will become apparent to those skilled in the art by reading the following detailed description of preferred embodiments. The drawings are only for the purpose of illustrating the preferred embodiment, and are not considered as limiting the disclosure. Moreover, same parts are denoted by same reference numerals throughout the drawings. In the attached drawings:

FIG. 1 shows a schematic structural diagram of a multi-mode switching control system for photovoltaic arrays according to an embodiment of the disclosure.

DETAILED DESCRIPTION OF THE EMBODIMENTS

In the following, In the following, the specific embodiments of the disclosure will be described in further detail with the attached drawings and embodiments. The following embodiments are used to illustrate the disclosure, but are not used to limit the scope of the disclosure.

In the description of the disclosure, it may be understood that the azimuth or positional relationship indicated by the terms "center", "up", "down", "front", "back", "left", "right", "vertical", "horizontal", "top", "bottom", "inside" and "outside" is based on the azimuth or positional relationship shown in the attached drawings, only for the convenience of describing this disclosure and simplifying the description, and does not indicate or imply that the referred device or element must have a specific orientation, be constructed and operated in a specific orientation, so it cannot be understood as a limitation of the disclosure.

The terms "first" and "second" are only used for descriptive purposes, and cannot be understood as indicating or implying relative importance or implicitly indicating the number of indicated technical features. Therefore, the features defined as "first" and "second" may include one or more of these features explicitly or implicitly. In the description of this disclosure, unless otherwise specified, "multiple" means two or more.

In the description of this disclosure, it may be noted that unless otherwise specified and limited, the terms "installation", "connecting" and "connection" may be broadly understood, for example, a fixed connection, a detachable connection or an integral connection may be used, a mechanical connection or an electrical connection may be used, a direct connection may be used, an indirect connection through an intermediate medium may be used, and a connection inside two elements may be used. For those skilled in the art, the specific meanings of the above terms in this disclosure can be understood in specific circumstances.

The following is a description of preferred embodiments of the disclosure with reference to the accompanying drawings.

As shown in FIG. 1, an embodiment of the disclosure provides a multi-mode switching control system for photovoltaic arrays, which includes:

a first switching unit, configured for determining photovoltaic arrays to be switched and controlled, setting a plurality of solar illumination detection points on the photovoltaic arrays to be switched and controlled, and generating a normal tracking mode for the photovoltaic arrays to be switched and controlled based on the solar illumination detection points;

a second switching unit, configured for obtaining a shadow shielding state of the photovoltaic arrays to be switched and controlled, and generating a reverse tracking mode for the photovoltaic arrays to be switched and controlled based on the shadow shielding state;

a third switching unit, configured for detecting wind speed environment information of the photovoltaic arrays to be switched and controlled, and generating a setting-level wind avoidance mode for the photovoltaic arrays to be switched and controlled based on the wind speed environment information;

a fourth switching unit, configured for collecting snowpack environmental information of the photovoltaic arrays to be switched and controlled, and generating an inclined snow avoidance mode for the photovoltaic arrays to be switched and controlled based on the snowpack environmental information;

a fifth switching unit, configured for determining operation state of the photovoltaic arrays to be switched and controlled, and generating a maintenance mode for the photovoltaic arrays to be switched and controlled based on the operation state;

a sixth switching unit, configured for generating a priority control strategy for the normal tracking mode, the reverse tracking mode, the setting-level wind avoidance mode, the inclined snow avoidance mode and the maintenance mode when a preset control condition is monitored.

The technical scheme has the beneficial effects that the working modes (normal tracking mode, reverse tracking mode, setting-level wind avoidance mode, inclined snow avoidance mode and maintenance mode) of the photovoltaic arrays are adjusted in real time by monitoring the working state and external environmental conditions of the photovoltaic arrays in real time, so as to optimize the power generation performance of the photovoltaic arrays and improve the power generation efficiency and power station income of the photovoltaic arrays.

In some embodiments of the disclosure, the first switching unit is configured for the following:

the first switching unit is configured for detecting a real-time illumination intensity of each of the solar illumination detection points in real time and generating a first reference value according to the real-time illumination intensity;

the first switching unit is configured for obtaining a previous historical illumination intensity and corresponding historical power generation amount of each of the solar illumination detection points;

the first switching unit is configured for obtaining a power generation amount range corresponding to each historical illumination intensity, where the power generation amount range includes first power generation amount and second power generation amount, and the first power generation amount is smaller than the second power generation amount;

the first switching unit is configured for collecting and dividing all historical power generation amount, where when historical power generation amount is less than or equal to corresponding first power generation amount, all corresponding solar illumination detection points are divided into a first detection point set;

the first switching unit is configured for dividing all corresponding solar illumination detection points into a second detection point set when the historical power generation amount is greater than corresponding first power generation amount and less than or equal to corresponding second power generation amount;

the first switching unit is configured for dividing all corresponding solar illumination detection points into a third detection point set when the historical power generation amount is greater than corresponding second power generation amount;

the first switching unit is configured for calculating reference values corresponding to all the solar illumination detection points according to the first reference value, the first detection point set, the second detection point set and the third detection point set; and the first switching unit is configured for extracting all the reference values in real time, and selecting a maximum reference value to generate the normal tracking mode for the photovoltaic arrays to be switched and controlled.

In this embodiment, the product value of the real-time illumination intensity and the corresponding weight is calculated, and this product value is taken as the first reference value.

The technical scheme has the beneficial effects that the reference values corresponding to all solar illumination detection points are calculated according to the first reference value, the first detection point set, the second detection point set and the third detection point set, and the maximum reference value is selected to generate a normal tracking mode for the photovoltaic arrays to be switched and controlled, so that the photovoltaic panel can be determined to always face the sun.

In some embodiments of the disclosure, the first switching unit is configured for the following:

the first switching unit is configured for calculating a first reference optimization value corresponding to the first detection point set, and calculating a reference value of each of solar illumination detection points in the first detection point set based on the first reference optimization value and the first reference value;

the first switching unit is configured for obtaining a second reference optimization value corresponding to the second detection point set, and calculating a reference value of each of solar illumination detection points in the second detection point set based on the second reference optimization value and the first reference value; and the first switching unit is configured for calculating a third reference optimization value corresponding to the third detection point set, and calculating a reference value of each of solar illumination detection points in the third detection point set based on the third reference optimization value and the first reference value.

In this embodiment, the first reference optimization value and the third reference optimization value are calculated, and the second reference optimization value is preset in advance, and the specific value is 1.

The technical scheme has the beneficial effects that the reference value corresponding to the solar illumination detection point can be accurately obtained, the calculation accuracy is realized, and errors are avoided; and by setting the corresponding reference optimization value, the mode switching accuracy can be further ensured, and the power generation amount can be ensured.

In some embodiments of the disclosure, the first switching unit is configured for the following:

the first switching unit is configured for calculating the first reference optimization value according to following formula:

$$h1 = 1 - \frac{\sum_{i=1}^{n1}(d - di)}{f1}$$

where h1 is the first reference optimization value, n1 is a number of solar illumination detection points in the first detection point set, di is power generation amount corresponding to an i-th solar illumination detection point in the first detection point set, dis first power generation amount corresponding to the i-th solar illumination detection point, and f1 is power generation amount and value corresponding to a solar illumination detection point in the first detection point set; and the first switching unit is configured for calculating the third reference optimization value according to following formula:

$$h3 = 1 + \frac{\sum_{j=1}^{n3}(e - ej)}{f2}$$

where h3 is the third reference optimization value, n3 is a number of solar illumination detection points in the third detection point set, ej is power generation amount corresponding to a j-th solar illumination detection point in the third detection point set, e is second power generation amount corresponding to the j-th solar illumination detection point, and f2 is power generation amount and value corresponding to a solar illumination detection point in the third detection point set.

In some embodiments of the disclosure, the second switching unit is configured for the following:
- the second switching unit is configured for obtaining real-time image data of the photovoltaic arrays to be switched and controlled;
- the second switching unit is configured for preprocessing the real-time image data, where the preprocessing includes denoising and enhancing contrast;
- the second switching unit is configured for identifying a shadow area in the real-time image data based on an edge detection algorithm;
- the second switching unit is configured for calculating an area ratio ΔS between the shadow area and the real-time image data, and determining whether to generate the reverse tracking mode according to a relationship between the area ratio ΔS and a preset area ratio S;
- the second switching unit is configured for determining not to generate the reverse tracking mode when the area ratio ΔS is less than the preset area ratio S; and
- the second switching unit is configured for determining to generate the reverse tracking mode when the area ratio ΔS is greater than or equal to the preset area ratio S.

The technical scheme has the beneficial effects that when the area ratio ΔS is greater than or equal to the preset area ratio S, the reverse tracking mode is judged to be generated, so that the photovoltaic panel can avoid the shadow area and ensure the power generation efficiency.

In some embodiments of the disclosure, the third switching unit is configured for the following:
- the third switching unit is configured for detecting first wind speed data of the photovoltaic arrays to be switched and controlled at a first preset time node;
- the third switching unit is configured for detecting second wind speed data of the photovoltaic arrays to be switched and controlled at a second preset time node;
- the third switching unit is configured for calculating wind speed data difference value between the first wind speed data and the second wind speed data, and calculating time node difference value between the first preset time node and the second preset time node;
- the third switching unit is configured for calculating a data ratio of the wind speed data difference value and the time node difference value, and determining whether to generate the setting-level wind avoidance mode according to a relationship between the data ratio and a preset data ratio;
- the third switching unit is configured for determining not to generate the setting-level wind avoidance mode when the data ratio is less than the preset data ratio; and
- the third switching unit is configured for determining to generate the setting-level wind avoidance mode when the data ratio is greater than or equal to the preset data ratio.

The technical scheme has the beneficial effects that when the data ratio is greater than or equal to the preset data ratio, it is strong wind or bad weather at this time, the photovoltaic panel is leveled, so that the acting force of the wind is reduced and damage is avoided.

In some embodiments of the disclosure, the fourth switching unit is configured for the following:
- the fourth switching unit is configured for collecting surface temperature and reflectivity data of the photovoltaic arrays to be switched and controlled in real time by using an optical sensor;
- the fourth switch unit is configured for determining the photovoltaic arrays to be switched and controlled having snowpack when the surface temperature is less than a preset temperature and the reflectivity data is greater than a preset reflectivity;
- the fourth switching unit is configured for collecting ambient temperature of the photovoltaic arrays to be switched and controlled, and predicting a snowpack melting rate according to the ambient temperature;
- the fourth switching unit is configured for determining whether to generate the inclined snow avoidance mode according to a relationship between the snowpack melting rate and a preset snowpack melting rate;
- the fourth switching unit is configured for determining to generate the inclined snow avoidance mode when the snowpack melting rate is less than the preset snowpack melting rate; and
- the fourth switching unit is configured for determining not to generate the inclined snow avoidance mode when the snowpack melting rate is greater than or equal to the preset snowpack melting rate.

In this embodiment, a snowpack melting rate prediction model is pre-trained, and the prediction model of snowpack melting rate is based on different data samples, the types and matching probability that data samples match, and is trained to obtain.

The technical scheme has the beneficial effects that in snowy weather, the photovoltaic panel is tilted to avoid being covered by snowpack, and the normal work of the photovoltaic panel is maintained.

In some embodiments of the disclosure, the maintenance mode can realize the functions of bidirectional operation and setting level, which is configured for maintaining and overhauling the photovoltaic array tracking bracket.

In some embodiments of the disclosure, the sixth switching unit is configured for the following:
- the sixth switching unit is configured for obtaining influence attribute information generated by each of modes on the photovoltaic arrays to be switched and controlled and calculating a priority value corresponding to each of the modes according to the influence attribute information, where the modes include the normal tracking mode, the reverse tracking mode, the setting-level wind avoidance mode, the inclined snow avoidance mode and the maintenance mode;

the sixth switching unit is configured for generating the priority control strategy for the photovoltaic arrays to be switched and controlled based on the priority value; and the sixth switching unit is configured for calculating the priority value corresponding to each of the modes according to following formula:

$$gt = b \times \frac{\sum_{t=1}^{m}(rt \times kt)}{m}$$

where gt is a priority value corresponding to a t-th mode, b is a weight corresponding to the t-th mode, m is a number of influence attribute information corresponding to the t-th mode, rt is a numerical value of influence attribute information corresponding to the t-th mode, and kt is a weight of influence attribute information corresponding to the t-th mode.

In this embodiment, the influence attribute information includes the power generation performance, power generation efficiency, power generation stability and power generation amount of the photovoltaic array.

In this embodiment, the preset control condition is that there are two or more simultaneous modes, such as normal tracking mode, reverse tracking mode, setting-level wind avoidance mode, inclined snow avoidance mode and maintenance mode all exist at the same time, which meet the preset control condition, or normal tracking mode and setting-level wind avoidance mode exist at the same time, which meet the preset control condition.

The technical scheme has the beneficial effects that the disclosure obtains the influence attribute information generated by each mode on the photovoltaic arrays to be switched, and calculates the priority value corresponding to each mode according to the influence attribute information, which can lay a foundation for mode switching and provide data support. When multiple modes need to be switched at the same time, the multiple modes are executed in sequence according to the priority, so as to ensure normal power generation and avoid abrasion of the photovoltaic array.

In the description of the above embodiments, specific features, structures, materials or characteristics can be combined in any one or more embodiments or examples in a suitable way.

Although the disclosure has been described above with reference to embodiments, various modifications can be made to it and parts thereof can be replaced by equivalents without departing from the scope of the disclosure. In particular, as long as there is no structural conflict, all the features in the provided embodiments of the disclosure can be combined with each other in any way, and all these combinations are not described in this description only for the sake of omitting space and saving resources.

It can be understood by those skilled in the art that the above is only the preferred embodiment of the disclosure, and it is not used to limit the disclosure. Although the disclosure has been described in detail with reference to the foregoing embodiments, it is still possible for those skilled in the art to modify the technical scheme described in the foregoing embodiments or to replace some of its technical features equally. Any modification, equivalent substitution, improvement, etc. made within the spirit and principle of the disclosure may be included in the protection scope of the disclosure.

The invention claimed is:

1. A multi-mode switching control system for photovoltaic arrays, comprising:

a first switching unit, configured for determining photovoltaic arrays to be switched and controlled, setting a plurality of solar illumination detection points on the photovoltaic arrays to be switched and controlled, and generating a normal tracking mode for the photovoltaic arrays to be switched and controlled based on the solar illumination detection points, a second switching unit, configured for obtaining a shadow shielding state of the photovoltaic arrays to be switched and controlled, and generating a reverse tracking mode for the photovoltaic arrays to be switched and controlled based on the shadow shielding state, a third switching unit, configured for detecting wind speed environment information of the photovoltaic arrays to be switched and controlled, and generating a setting-level wind avoidance mode for the photovoltaic arrays to be switched and controlled based on the wind speed environment information, a fourth switching unit, configured for collecting snowpack environmental information of the photovoltaic arrays to be switched and controlled, and generating an inclined snow avoidance mode for the photovoltaic arrays to be switched and controlled based on the snowpack environmental information, a fifth switching unit, configured for determining operation state of the photovoltaic arrays to be switched and controlled, and generating a maintenance mode for the photovoltaic arrays to be switched and controlled based on the operation state, a sixth switching unit, configured for generating a priority control strategy for the normal tracking mode, the reverse tracking mode, the setting-level wind avoidance mode, the inclined snow avoidance mode and the maintenance mode when a preset control condition is monitored, wherein the first switching unit is configured for detecting a real-time illumination intensity of each of the solar illumination detection points in real time and generating a first reference value according to the real-time illumination intensity;

the first switching unit is configured for obtaining a previous historical illumination intensity and corresponding historical power generation amount of each of the solar illumination detection points;

the first switching unit is configured for obtaining a power generation amount range corresponding to each historical illumination intensity, wherein the power generation amount range comprises first power generation amount and second power generation amount, and the first power generation amount is smaller than the second power generation amount;

the first switching unit is configured for collecting and dividing all historical power generation amount, wherein when historical power generation amount is less than or equal to corresponding first power generation amount, all corresponding solar illumination detection points are divided into a first detection point set;

the first switching unit is configured for dividing all corresponding solar illumination detection points into a second detection point set when the historical power generation amount is greater than corresponding first power generation amount and less than or equal to corresponding second power generation amount;

the first switching unit is configured for dividing all corresponding solar illumination detection points into a third detection point set when the historical power generation amount is greater than corresponding second power generation amount;

the first switching unit is configured for calculating reference values corresponding to all the solar illumination detection points according to the first reference value, the first detection point set, the second detection point set and the third detection point set; and the first switching unit is configured for extracting all the reference values in real time, and selecting a maximum reference value to generate the normal tracking mode for the photovoltaic arrays to be switched and controlled.

2. The multi-mode switching control system for photovoltaic arrays according to claim 1, wherein:

the first switching unit is configured for calculating a first reference optimization value corresponding to the first detection point set, and calculating a reference value of each of solar illumination detection points in the first detection point set based on the first reference optimization value and the first reference value;

the first switching unit is configured for obtaining a second reference optimization value corresponding to the second detection point set, and calculating a reference value of each of solar illumination detection points in the second detection point set based on the second reference optimization value and the first reference value; and the first switching unit is configured for calculating a third reference optimization value corresponding to the third detection point set, and calculating a reference value of each of solar illumination detection points in the third detection point set based on the third reference optimization value and the first reference value.

3. The multi-mode switching control system for photovoltaic arrays according to claim 2, wherein the first switching unit is configured for calculating the first reference optimization value according to following formula:

$$h1 = 1 - \frac{\sum_{i=1}^{n1}(d - di)}{f1}$$

wherein h1 is the first reference optimization value, n1 is a number of solar illumination detection points in the first detection point set, di is power generation amount corresponding to an i-th solar illumination detection point in the first detection point set, d is first power generation amount corresponding to the i-th solar illumination detection point, and f1 is power generation amount and value corresponding to a solar illumination detection point in the first detection point set; and the first switching unit is configured for calculating the third reference optimization value according to following formula:

$$h3 = 1 - \frac{\sum_{j=1}^{n3}(e - ej)}{f2}$$

wherein h3 is the third reference optimization value, n3 is a number of solar illumination detection points in the third detection point set, ej is power generation amount corresponding to a j-th solar illumination detection point in the third detection point set, e is second power generation amount corresponding to the j-th solar illumination detection point, and f2 is power generation amount and value corresponding to a solar illumination detection point in the third detection point set.

4. The multi-mode switching control system for photovoltaic arrays according to claim 1, wherein:

the second switching unit is configured for obtaining real-time image data of the photovoltaic arrays to be switched and controlled;

the second switching unit is configured for preprocessing the real-time image data, wherein the preprocessing comprises denoising and enhancing contrast;

the second switching unit is configured for identifying a shadow area in the real-time image data based on an edge detection algorithm;

the second switching unit is configured for calculating an area ratio $\Delta S$ between the shadow area and the real-time image data, and determining whether to generate the reverse tracking mode according to a relationship between the area ratio $\Delta S$ and a preset area ratio S;

the second switching unit is configured for determining not to generate the reverse tracking mode when the area ratio $\Delta S$ is less than the preset area ratio S; and the second switching unit is configured for determining to generate the reverse tracking mode when the area ratio $\Delta S$ is greater than or equal to the preset area ratio S.

5. The multi-mode switching control system for photovoltaic arrays according to claim 1, wherein the third switching unit is configured for detecting first wind speed data of the photovoltaic arrays to be switched and controlled at a first preset time node;

the third switching unit is configured for detecting second wind speed data of the photovoltaic arrays to be switched and controlled at a second preset time node;

the third switching unit is configured for calculating wind speed data difference value between the first wind speed data and the second wind speed data, and calculating time node difference value between the first preset time node and the second preset time node;

the third switching unit is configured for calculating a data ratio of the wind speed data difference value and the time node difference value, and determining whether to generate the setting-level wind avoidance mode according to a relationship between the data ratio and a preset data ratio;

the third switching unit is configured for determining not to generate the setting-level wind avoidance mode when the data ratio is less than the preset data ratio; and the third switching unit is configured for determining to generate the setting-level wind avoidance mode when the data ratio is greater than or equal to the preset data ratio.

6. The multi-mode switching control system for photovoltaic arrays according to claim 1, wherein the fourth switching unit is configured for collecting surface temperature and reflectivity data of the photovoltaic arrays to be switched and controlled in real time by using an optical sensor;

the fourth switch unit is configured for determining the photovoltaic arrays to be switched and controlled having snowpack when the surface temperature is less than a preset temperature and the reflectivity data is greater than a preset reflectivity;

the fourth switching unit is configured for collecting ambient temperature of the photovoltaic arrays to be switched and controlled, and predicting a snowpack melting rate according to the ambient temperature;

the fourth switching unit is configured for determining whether to generate the inclined snow avoidance mode according to a relationship between the snowpack melting rate and a preset snowpack melting rate;

the fourth switching unit is configured for determining to generate the inclined snow avoidance mode when the snowpack melting rate is less than the preset snowpack melting rate; and the fourth switching unit is configured for determining not to generate the inclined snow avoidance mode when the snowpack melting rate is greater than or equal to the preset snowpack melting rate.

7. The multi-mode switching control system for photovoltaic arrays according to claim 1, wherein the sixth switching unit is configured for obtaining influence attribute information generated by each of modes on the photovoltaic arrays to be switched and controlled and calculating a priority value corresponding to each of the modes according to the influence attribute information, wherein the modes comprise the normal tracking mode, the reverse tracking mode, the setting-level wind avoidance mode, the inclined snow avoidance mode and the maintenance mode;

the sixth switching unit is configured for generating the priority control strategy for the photovoltaic arrays to be switched and controlled based on the priority value; and the sixth switching unit is configured for calculating the priority value corresponding to each of the modes according to following formula:

$$gt = b \times \frac{\sum_{t=1}^{m}(rt \times kt)}{m}$$

wherein gt is a priority value corresponding to a t-th mode, b is a weight corresponding to the t-th mode, m is a number of influence attribute information corresponding to the t-th mode, rt is a numerical value of influence attribute information corresponding to the t-th mode, and kt is a weight of influence attribute information corresponding to the t-th mode.

* * * * *